(12) United States Patent
Tsao et al.

(10) Patent No.: US 8,034,517 B2
(45) Date of Patent: Oct. 11, 2011

(54) COLOR FILTER AND MANUFACTURING METHOD THEREOF

(75) Inventors: Chun-Chieh Tsao, Hsinchu (TW); Shu-Chin Lee, Hsinchu (TW); Hsiang-Lin Lin, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 1013 days.

(21) Appl. No.: 11/933,421

(22) Filed: Nov. 1, 2007

(65) Prior Publication Data

US 2008/0158703 A1 Jul. 3, 2008

(30) Foreign Application Priority Data

Jan. 3, 2007 (TW) .............................. 96100209 A (51) Int. Cl.
*G02B 5/20* (2006.01)
*G03F 1/00* (2006.01)

(52) U.S. Cl. ........................................ 430/7; 359/885
(58) Field of Classification Search .......... None
See application file for complete search history.

(56) References Cited

U.S. PATENT DOCUMENTS

| 2001/0007733 A1* | 7/2001 | Matsuyama et al. ............. 430/7 |
| 2002/0192596 A1* | 12/2002 | Ueda et al. ............... 430/281.1 |
| 2003/0118921 A1 | 6/2003 | Chen et al. |
| 2004/0038138 A1 | 2/2004 | Kiguchi et al. |
| 2004/0100596 A1 | 5/2004 | Lan et al. |
| 2004/0229139 A1 | 11/2004 | Tanaka et al. |
| 2004/0253526 A1* | 12/2004 | Shih et al. ..................... 430/7 |
| 2005/0100660 A1* | 5/2005 | Ito et al. ....................... 427/66 |
| 2005/0174513 A1 | 8/2005 | Sakurada |
| 2005/0255392 A1 | 11/2005 | Tsai et al. |
| 2006/0284956 A1* | 12/2006 | Chou ........................... 347/107 |

FOREIGN PATENT DOCUMENTS

| CN | 1431527 | 7/2003 |
| CN | 1892265 | 1/2007 |
| JP | 10104420 | 4/1998 |
| JP | 10142418 | 5/1998 |
| JP | 2000122072 | 4/2000 |
| JP | 2000180841 | 6/2000 |

(Continued)

OTHER PUBLICATIONS

"Office Action of Taiwan counterpart application", issued on Apr. 6, 2010, p. 1-p. 8.

*Primary Examiner* — Cynthia Kelly
*Assistant Examiner* — Anna Verderame
(74) *Attorney, Agent, or Firm* — Jianq Chyun IP Office (57) ABSTRACT

A manufacturing method of a color filter comprising the following steps is provided. At first, a transparent substrate is provided. Next, a black matrix is formed on the transparent substrate to define a plurality of pixel areas on the transparent substrate. Then, an isolation layer is formed and patterned on the black matrix and then Red/Green/Blue color filter inks are filled into each of the pixel areas separately by inkjet printing. After that, the color filter inks are dried to form color filter units and optionally the isolation layer can further be patterned to form plenty of photo spacers on the black matrix. The isolation layers prevented the color filter inks from spilling out of the pixel areas and color mixing problems during color filter inkjet fabrication. Besides, it is characterized that the color filter units can be formed with even thickness.

17 Claims, 8 Drawing Sheets

FOREIGN PATENT DOCUMENTS

| | | |
|---|---|---|
| JP | 2003035814 | 2/2003 |
| JP | 2003043243 | 2/2003 |
| JP | 2006064858 | 3/2006 |
| TW | 484022 | 4/2002 |
| TW | 526340 | 4/2003 |
| TW | 536478 | 6/2003 |
| TW | I224213 | 11/2004 |
| TW | I247164 | 1/2006 |
| TW | I258619 | 7/2006 |
| TW | I257488 | 7/2006 |

* cited by examiner

COLOR FILTER AND MANUFACTURING METHOD THEREOF

CROSS-REFERENCE TO RELATED APPLICATION

This application claims the priority benefit of Taiwan application serial no. 96100209, filed on Jan. 3, 2007. All disclosure of the Taiwan application is incorporated herein by reference.

BACKGROUND OF THE INVENTION

1. Field of the Invention

The present invention generally relates to a color filter and a manufacturing method thereof, in particular, to a color filter formed by inkjet printing and manufacturing method thereof.

2. Description of Related Art

The liquid crystal display (LCD) is becoming the main project of the display research and continuously towards the development of colorized display because the LCD has the advantages of low operation voltage, no radiation, light weight and small volume etc., which are not possessed by the cathode ray tube display (CRT).

The liquid crystal display can display full color picture by using a color filter. Recently, a manufacturing method of a color filter using inkjet printing is developed. At first, a black matrix is formed on a substrate to define a plurality of pixel areas. Then, Red/Green/Blue pigments are filled into the pixel areas using inkjet printing. And then, the pigments are solidified by thermal baking process.

Figure 1:
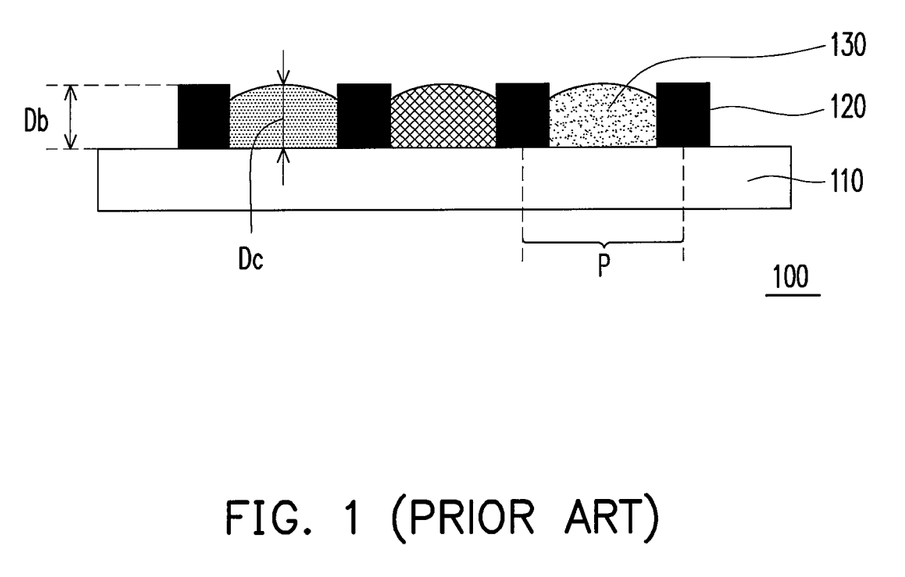
FIG. 1 is a schematic, cross-sectional view of a conventional color filter formed by inkjet printing.

The inkjet printing technique can coat the color pigment on the substrate directly to form the color filter, with the advantages that no mask or stencil is needed to form the color filter. So that, the manufacturing flow becomes easy and the problems resulted from using acid-base solutions will not be occurred. FIG. 1 is a cross-sectional view of a conventional color filter formed by using inkjet printing. Please refer to FIG. 1, the conventional color filter 100 includes a glass substrate 110 and a black matrix 120 formed on the glass substrate 110. The black matrix 120 defines a plurality of pixel areas P filled with color pigment 130. It is noted that the color pigment 130 is filled into the pixel areas P by using inkjet printing.

The ratio of solvent to solution of the color pigment 130 is about 70% to 80%, that is, 70% to 80% of the solution is solvent. In the process of solidifying the color pigment 130, a great deal of solvent is vaporized that makes the color pigment 130 constrict so that the pixel areas P cannot be fully filled with the color pigment 130. Moreover, in order to make the thickness of the solidified pigment layer be same as the thickness of the black matrix 120, the column of the color pigment 130 before being solidified must relatively larger than the capacity of the pixel area P, and the color pigment 130 is filled into the pixel areas P with high flow velocity. As a result, the color pigment 130 will spill out of the pixel areas P so that color mixing problem may occur. Accordingly, The column of the color pigment 130 may be limited to avoid the color pigment from spilling out of the pixel areas P and color mixing problem, however, this inevitably result in unfilled pixel areas P and insufficient color saturation instead.

Furthermore, a hydrophobic treatment is performed on the black matrix 120 to modify the surface tension of the color pigment 130 on the black matrix 120. As shown in FIG. 1, under the influence of the surface tension, an uneven surface of the color pigment 130, whose center is protuberant and circumambience is sunken, is appeared. The color filter 100 with uneven surface results in worse coverage of the film layers in the follow-up process, and the liquid crystal display having such a color filter 100 may suffer from mura phenomenon.

It is known from experiments that in the color filter 100, a specific relation exists between the film thickness Db of the black matrix 120 and the film thickness Dc of the color pigment 130. For example, the color pigment 130 is filled using inkjet printing at the film thickness Db of the black matrix 120 of 2 micron. After molding, if the maximal film thickness Dc of the color pigment 130 is equal to or slightly bigger than the film thickness Db of the black matrix 120, the difference of the color pigment 130 is about 0.5 micron to 0.8 micron. However, when the maximal film thickness Dc of the color pigment 130 is equal approximately from ⅓ to ½ of the film thickness Db of the black matrix 120, the difference of the film thickness Dc of the color pigment 130 is only about 0.1 micron. That is to say, when the film thickness Db of the black matrix 120 is three times or double larger than the film thickness De of the color pigment 130, the color pigment 130 has a uniform and even surface. However, the protruding black matrix 120 causes the problem of uneasy coverage of the follow-up film layer.

Accordingly, it is an important issue to avoid color pigment mixing as well as manufacture a color filter with uniform pigment thickness and even surface in manufacturing the color filter.

SUMMARY OF THE INVENTION

Accordingly, the present invention is directed to a manufacturing method for manufacturing color filter with high yield and high quality.

The present invention is directed to a color filter with high yield and high quality.

As embodied and broadly described herein, the present invention provides a manufacturing method of a color filter. The manufacturing method comprising: first, providing a transparent substrate; next forming a black matrix on the transparent substrate to define a plurality of pixel areas on the transparent substrate; next forming an isolation layer on the black matrix; and then filling a color pigment in the pixel areas respectively; furthermore, drying the color pigment to form a plurality of color filter units; and patterning the isolation layer to form a plurality of photo spacers on the black matrix.

According to an embodiment of the present invention, the process of forming the isolation layer comprises: forming a layer of photosensitive material on the transparent substrate; and performing a lithography process on the layer of photosensitive material to pattern the layer of photosensitive material.

According to an embodiment of the present invention, a mask used in the lithography process is the same mask used in forming the black matrix.

According to an embodiment of the present invention, the black matrix is used as the mask and the backward exposure is performed on the layer of photosensitive material from a side of the transparent substrate far away from the layer of photosensitive material, in the lithography process.

According to an embodiment of the present invention, the manufacturing method further comprises: performing a first thermal treatment process on the layer of photosensitive material after patterning the layer of photosensitive material. The processing temperature of the first thermal treatment process, for example, is in the range from 90° C. to 120° C. The first thermal treatment process, for example, is baking.

According to an embodiment of the present invention, the processing temperature of drying the color pigment is in the range from 90° C. to 120° C.

According to an embodiment of the present invention, the manufacturing method further comprises: performing a second thermal treatment process after patterning the isolation layer. The processing temperature of the second thermal treatment process, for example, is in the range from 200° C. to 240° C. The second thermal treatment process, for example, is baking.

According to an embodiment of the present invention, the sum of the film thickness of the isolation layer and the film thickness of the black matrix is larger than or equal to double of the film thickness of the color filter units. The film thickness of the color filter units, for example, is substantially the same as the film thickness of the black matrix.

According to an embodiment of the present invention, the color pigment is filled in the pixel areas by inkjet printing.

In addition, the present invention provides another manufacturing method of a color filter. The manufacturing method is described as follow. First, providing a transparent substrate; next, forming a black matrix on the transparent substrate to define a plurality of pixel areas on the transparent substrate; next, forming an isolation layer on the black matrix; next, filling a color pigment in the pixel areas respectively; next, drying the color pigment to form a plurality of color filter units; and removing the isolation layer.

According to an embodiment of the present invention, the process of forming the isolation layer comprises: forming a layer of photosensitive material on the transparent substrate; and performing a lithography process on the layer of photosensitive material to pattern the layer of photosensitive material.

According to an embodiment of the present invention, a mask used in the lithography process is the same mask used in forming the black matrix.

According to an embodiment of the present invention, the black matrix is used as the mask and the backward exposure is performed on the layer of photosensitive material from a side of the transparent substrate far away from the layer of photosensitive material, in the lithography process.

According to an embodiment of the present invention, the manufacturing method further comprises: performing a first thermal treatment process on the layer of photosensitive material after patterning the layer of photosensitive material. The processing temperature of the first thermal treatment process, for example, is in the range from 90° C. to 120° C. The first thermal treatment process, for example, is baking.

According to an embodiment of the present invention, the processing temperature of drying the color pigment is in the range from 90° C. to 120° C.

According to an embodiment of the present invention, the manufacturing method further comprises: performing a second thermal treatment process after removing the isolation layer. The processing temperature of the second thermal treatment process, for example, is in the range from 200° C. to 240° C. The second thermal treatment process, for example, is baking.

According to an embodiment of the present invention, the sum of the film thickness of the isolation layer and the film thickness of the black matrix, for example, is bigger than or equal to double of the film thickness of the color filter units.

According to an embodiment of the present invention, the film thickness of the color filter units, for example, is substantially the same as the film thickness of the blackness.

According to an embodiment of the present invention, the color pigment is filled in the pixel areas by ink-jet printing.

Furthermore, the present invention provides a color filter. The color filter comprises a transparent substrate, a black matrix, a plurality of color filter units and a plurality of photo spacers. The black matrix is formed on the transparent substrate to define a plurality of pixel areas on the transparent substrate. The color filter units are formed in the pixel areas respectively and then the photo spacers are formed on the black matrix.

According to an embodiment of the present invention, the material of the photo spacer comprises photosensitive material.

According to an embodiment of the present invention, the sum of the height of the photo spacers and the film thickness of the black matrix, for example, is bigger than or equal to double of the film thickness of the color filter units.

According to an embodiment of the present invention, the film thickness of the color filter units, for example, is substantially the same as the film thickness of the black matrix.

According to an embodiment of the present invention, the material of the transparent substrate comprises glass. The material of the color filter units comprises resin.

The present invention can prevent the color pigment from spilling out of the pixel areas and color mixing problem in inkjet printing process by means of forming the isolation layer on the black matrix. The height of the isolation layer allows enough color pigment to be filled so that a color filter with uniform thickness and good quality is obtained. Furthermore, the liquid crystal display using the color filter of the present invention has better display quality.

These and other exemplary embodiments, features, aspects, and advantages of the present invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2A:
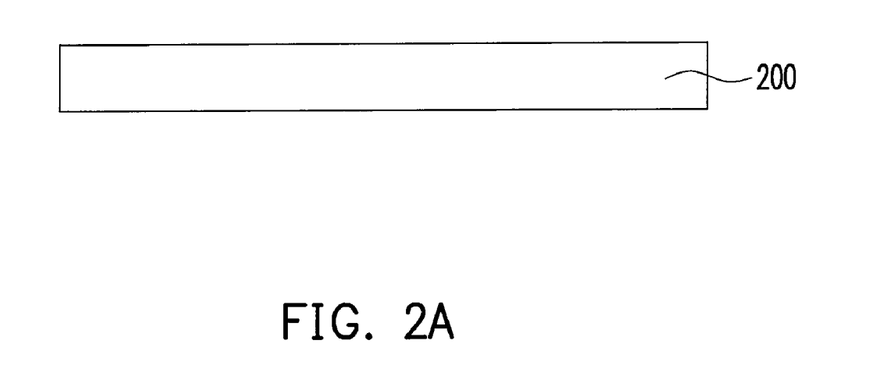
FIGS. 2A to 2G are schematic, cross-sectional views illustrating the steps involved in the manufacturing method of the color filter according to a first embodiment of the present invention.
Figure 2B:
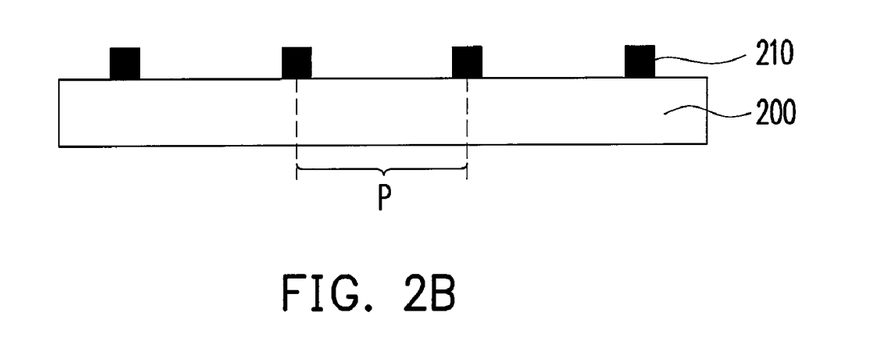

FIGS. 2A-2G are schematic, cross-sectional views illustrating the steps involved in the manufacturing method of the color filter according to the first embodiment of the present invention. At first, as shown in FIG. 2A, a transparent substrate 200 is provided. The material of the transparent substrate 200, for example, is glass. In the other embodiments, the material of the transparent substrate 200 may also be the other applicable transparent material used in the relating technology field.

Next, a black matrix 210 is formed on the transparent substrate 200 (shown in FIG. 2B) to define a plurality of pixel areas P on the transparent substrate 200. In this embodiment of the present invention, the black matrix 210 having a plurality of pixel areas P is formed by the opaque resin or metal etc., by using lithography process.

Figure 2C:
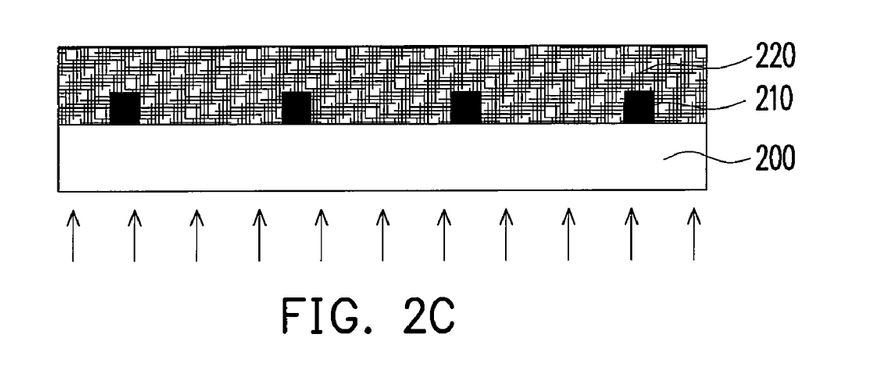

Next, referring to FIG. 2C, after the black matrix 210 is formed, for example, a layer of photosensitive material 220 is formed on the substrate 200 and covers the black matrix 210. Then, a lithography process is performed to pattern the layer of photosensitive material 220. In this embodiment, the black matrix 210 can be used as a mask and a backward exposure is performed on the layer of photosensitive material 220 from the side of the substrate 200 far away from the layer of photosensitive material 220 in the above lithography process (as shown in FIG. 2C). It is noted that the layer of photosensitive material 220 should be selected from positive photoresist materials if the backward exposure is performed on the layer of photosensitive material 220 by using the black matrix 210 as the mask. The mask misalignment can be prevented by using the above-mentioned method to pattern the layer of photosensitive material 220. In addition, the manufacturing process can be simplified and the processing yield can be improved accordingly.

Figure 2D:
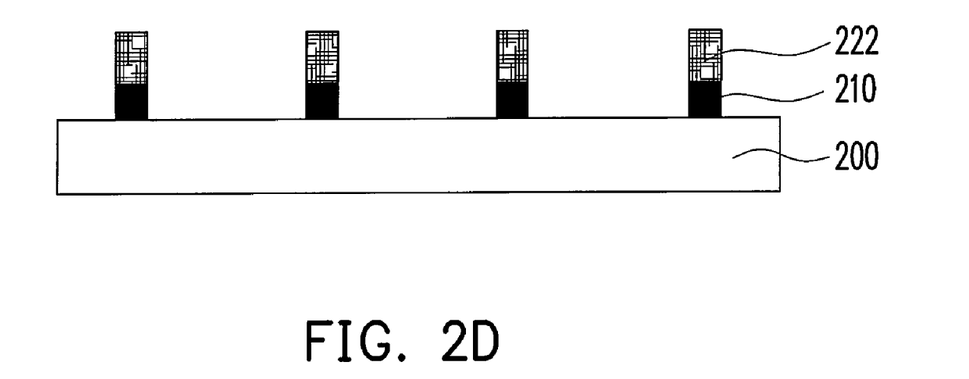

Next, after the layer of photosensitive material 220 is patterned, a first thermal treatment process, for example of baking, is performed on the layer of photosensitive material 220. The processing temperature of the first thermal treatment process is in the range from 90° C. to 120° C. Thus, the layer of photosensitive material 220 is solidified in preliminary to form an isolation layer 222 as shown in FIG. 2D.

Figure 2E:
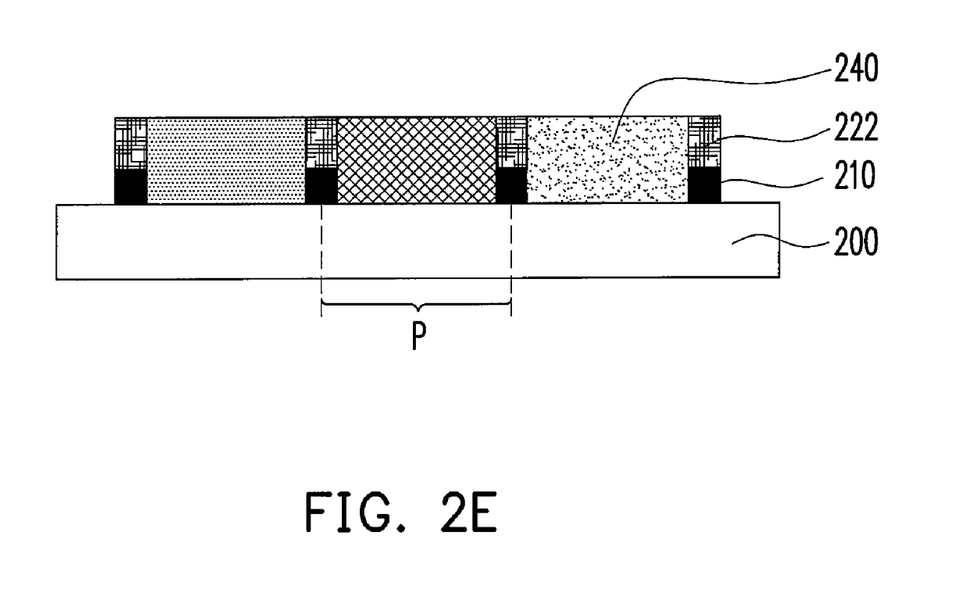

Next, referring to FIG. 2E, after the isolation layer 222 is formed, color pigment 240, such as resin material, can be filled in different pixel areas P. In this embodiment, different color pigment, such as Red, Green or Blue color pigment etc., may be sequentially filled in the pixel areas P by ink-jet printing. Compared with the prior art suffering from the spilling out and the color mixing of color pigment when filling the color pigment in pixel areas by inkjet printing, the isolation layer 222 of the present invention can effectively isolate the color pigment 240 in different pixel areas P as shown in FIG. 2E. As a result, neither complicated hydrophobic treatment on the black matrix 210 nor adjustment of the amount of ink is required in the present invention. In addition, with respect to the phenomena of the thermal tension of the color pigment 240 in the subsequent baking process, the isolation layer 222 is conducive to increase the height of the color pigment 240 filled in the pixel areas P, so that an ideal height of the color pigment 240 is preserved after the color pigment 240 is dried.

Figure 2F:
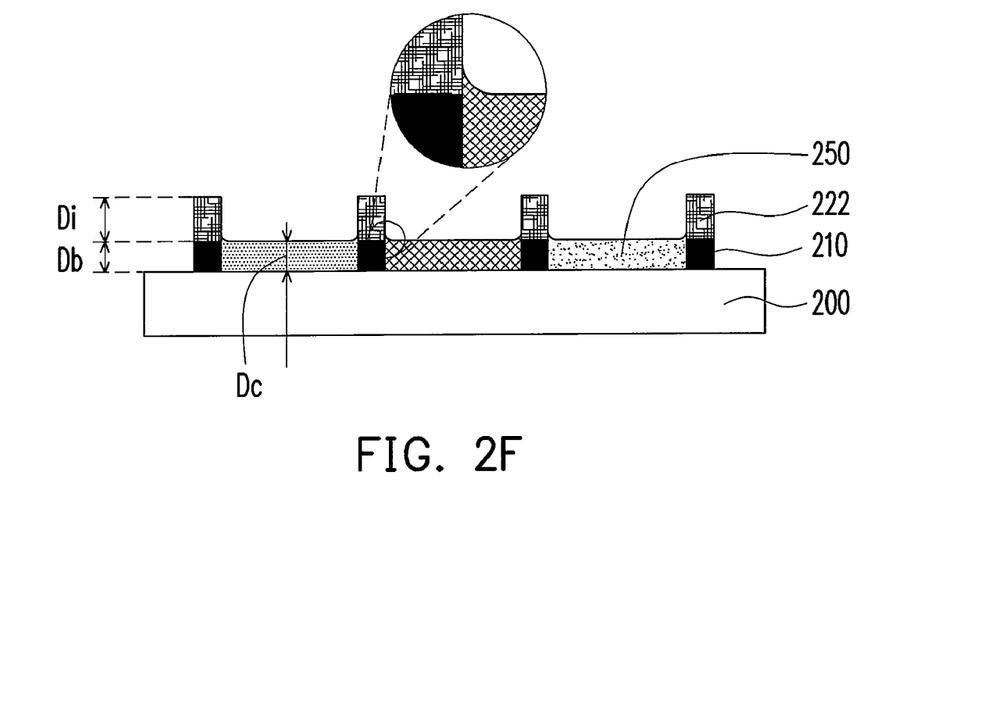

Next, referring to FIGS. 2E to 2F, the color pigment 240 is dried to form a plurality of color filter units 250. The processing temperature of drying the color pigment 240, for example, ranges from 90° C. to 120° C. to volatilize the solvent contained in the color pigment 240 and solidify the color pigment 240 preliminarily. After the solvent contained in the color pigment 240 is volatilized, the color pigment 240 will be constricted. Accordingly, in order to make the desired film thickness Dc of the color filter units 250 substantially equal to the film thickness Db of the black matrix 210, it is preferred to fill the larger amount of the color pigment 240 in the pixel areas P. In the present invention, the isolation layer 222 allows to fill larger amount of the color pigment 240 in the pixel areas P so as to avoid the problems derived from the constriction of the color pigment 240.

In addition, it is known from experimental results that when the shield thickness, i.e., the sum of the film thickness Di of the isolation layer 222 and the film thickness Db of the black matrix 210 surrounding the color filter units 250, is the double or larger than the desired film thickness Dc of the color filter units 250, the color filter units 250 with even film thickness Dc can be obtained. In other words, the difference of the film thickness of the center of the color filter units 250 and the film thickness of the portion of the color filter units 250 adjacent to the edge of the black matrix 210 becomes less. As a result, the isolation layer can further avoid the mura formation of the liquid crystal display so as to improve the image quality thereof.

Figure 2G:
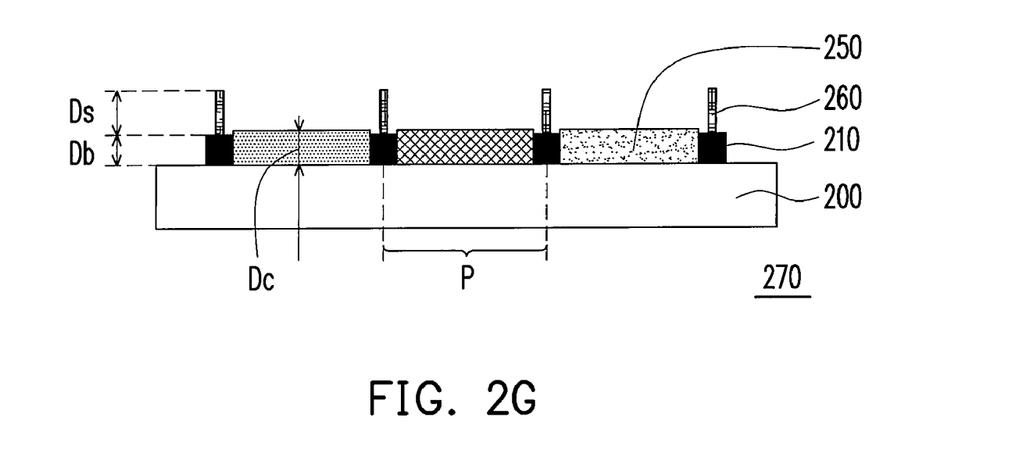

Then, please refer to FIGS. 2F and 2G, since the processing temperature is under good control in the first thermal treatment process and the process of drying the color pigment 240, the isolation layer 222 made of positive photoresist material still has photosensitivity. As a result, the second exposure can be performed on the isolation layer 222 in this embodiment to pattern the isolation layer 222 to form a plurality of spacers, such as photo spacers 260, on the black matrix 210. Generally speaking, the photo spacers 260 are used to maintain the cell gap of the liquid crystal display panel. In this embodiment, by using the isolation layer 222 to form the photo spacers 260, additional steps for forming photo spacers 260 in the prior art can be omitted, so that the process can be simplified and the cost can be reduced. Furthermore, in this embodiment the photo spacers 260 are formed on the black matrix 210 in such a way that it can prevent the photo spacers 260 from blocking the light transmitting the pixel areas P, so as to increase the whole display brightness as compared to the case of dispersing ball spacers.

In this embodiment, only a mask process is needed to pattern the isolation layer 222 as well as the photo spacers 260 formation, so that the process can be simplified and the yield can be increased. In particular, in this step the needless part of the isolation layer 222 can be removed by dry etching or a specific developer or stripper so that the color filter units 250 and the black matrix 210 will not be corroded or damaged.

In fact, other manners for manufacturing the color filter can also be adopted in the present invention. For example, the mask for fabricating the black matrix 210 can be reused in the lithography process for patterning the layer of photosensitive material for performing a front exposure to the layer of photosensitive material, so as to save the cost of mask. Herein, the photosensitive material can be positive photoresist material or negative photoresist material depending on the type of the mask used to fabricate the black matrix 210. In particular, if a negative mask, i.e., the pattern of the mask is complementary to the pattern of the black matrix, is used to fabricate the black matrix 210, the negative photoresist material is needed for the layer of photosensitive material 220. It is noted that when being made of negative photoresist material, the isolation layer 222 is transferred into photo-insensitive after being patterned and a secondary exposure process is inactive. Thus, operose patterning methods, such as plasma etching, should be performed on the isolation layer 222 to form the plurality of photo spacers 260. However, the negative photoresist material is not excluded to fabricate the isolation layer 222 in the present invention based on various considerations.

In addition, a second thermal treatment process, such as baking, can be performed after the photo spacers 260 are formed in this embodiment. The processing temperature of the second thermal treatment process, for example, is in the range from 200° C. to 240° C., which makes the color filter units 250 and the photo spacers 260 be completely cured to proceed the follow-up process. Furthermore, uneven acute angles at the edges of the color filter units 250 may occur after the above lithography process, which may lead to worse coverage of the film layers in the follow-up process. The second thermal treatment process can eliminate the acute angles at the edges of the color filter units 250, which advantages the formation of the follow-up film layer.

Figure 3:
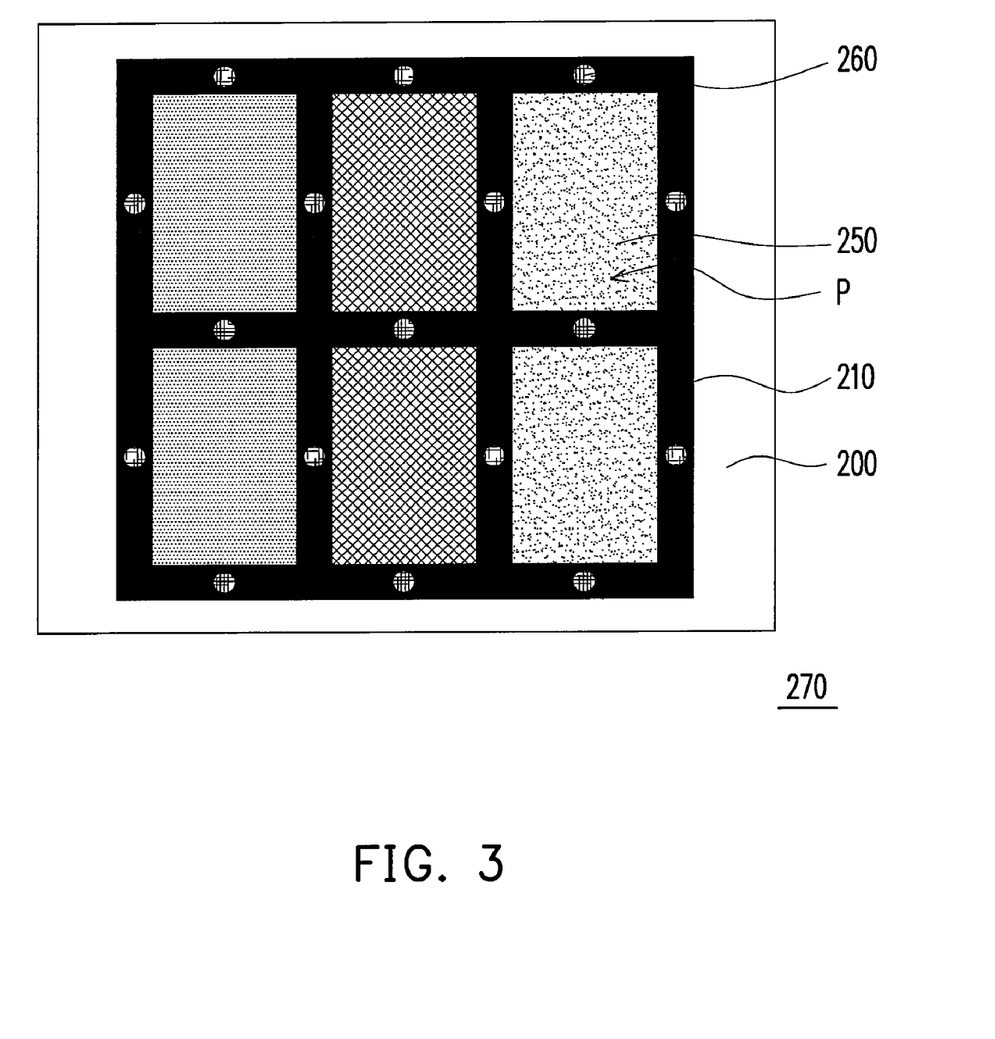
FIG. 3 is a schematic, top view of the color filter according to the first embodiment of the present invention.

FIG. 3 is a schematic, top view of the color filter manufactured according to the first embodiment of the present invention. As shown in FIG. 3, the color filter 270 includes a transparent substrate 200, a black matrix 210, a plurality of color filter units 250 and a plurality of photo spacers 260. The black matrix 210 is formed on the transparent substrate 200, and defines a plurality of pixel areas P. The plurality of color filter units 250 are formed on the pixel areas P, respectively. It is noted that at least one or more photo spacers 260 are formed on the black matrix 210 surrounding each pixel area P. The photo spacers 260, for example, are taken in column (shown in FIG. 3), prism or other shapes of pillars. The color filter units 250 made by the manufacturing method of the present invention has even film thickness, and mura phenomenon of the liquid crystal display is effectively prevented as applying the color filter units 250.

The Second Embodiment

Figure 4A:
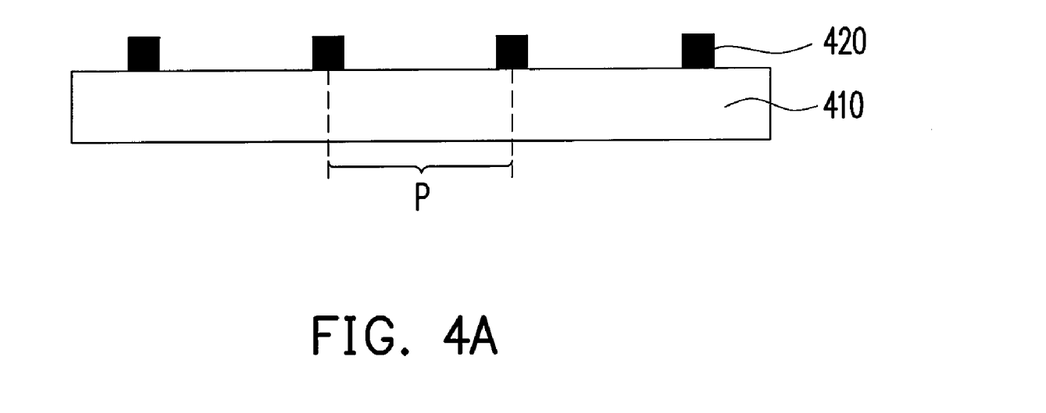
FIGS. 4A to 4F are views illustrating the manufacturing method of the color filter according to a second embodiment of the present invention.

FIG. 4A to 4F illustrate the manufacturing method according to a second embodiment of the present invention. Referring to FIG. 4A, at first, a transparent substrate 410 is provided and the black matrix 420 is formed on the transparent substrate 410 to define a plurality of pixel areas P. In the second embodiment, the material of the transparent substrate 410, for example, is glass. The material of the black matrix 420, for example, is metal or opaque resin.

Figure 4B:
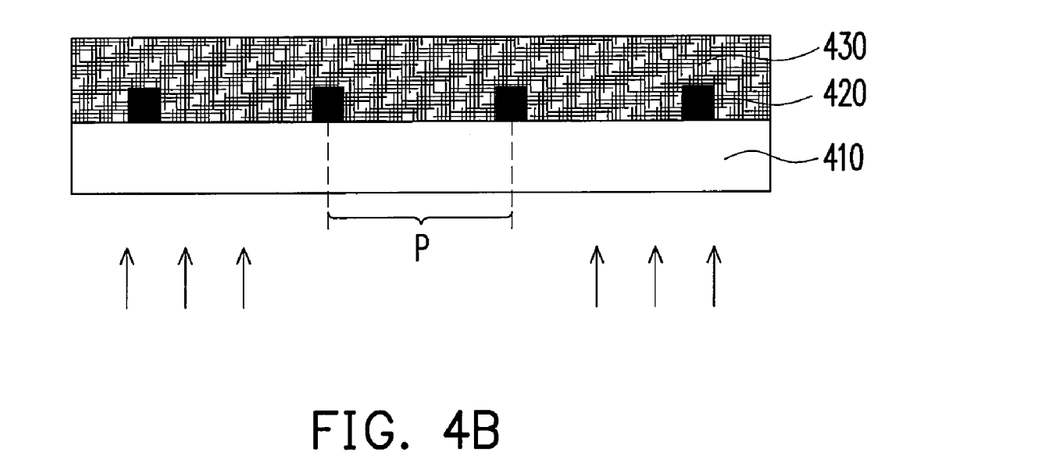

Next, referring to FIG. 4B. A layer of photosensitive material 430 is formed on the transparent substrate 410, wherein the layer of photosensitive material 430 covers the black matrix 420. Then, a lithography process is performed to pattern the layer of photosensitive material 430. In the second embodiment, the method for patterning the layer of photosensitive material 430 is the same as that in the first embodiment. The material of the layer of photosensitive material 430 can be either positive photoresist material or negative photoresist material. If using the black matrix 420 as a mask to perform a backward exposure (as shown in FIG. 4B), the layer of photosensitive material 430 should be made of positive photoresist material. The backward exposure processing preventing from the misalignment of the mask is conductive to improve the processing yield. On the other hand, the mask used to form the black matrix 420 can also be used to perform a front exposure. In this case, the type of the layer of photosensitive material 430 is selected according to the type of the mask. Particularly, no extra mask is required for patterning the photosensitive layer 430 in the present invention, so that the manufacturing cost is reduced. However, it is considerable to use another mask for patterning the layer of photosensitive material 430 in the lithography process of the present invention according to practical demands.

Figure 4C:
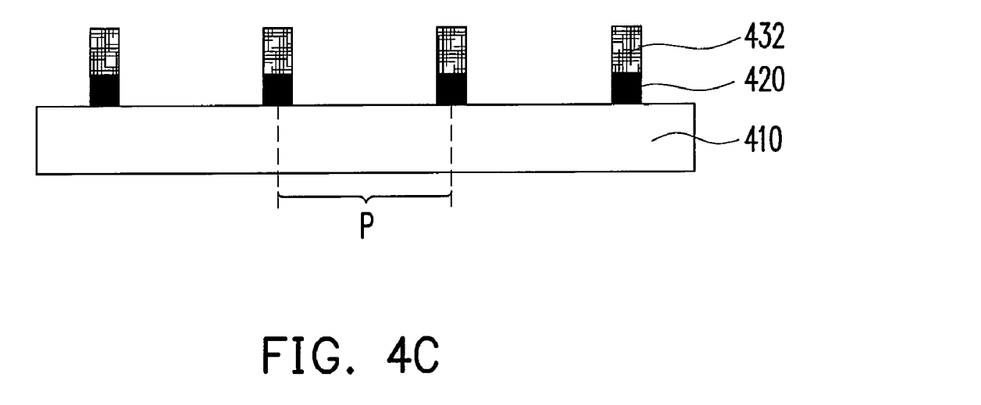

Next, referring to FIGS. 4B and 4C, a first thermal treatment process is further performed on the layer of photosensitive material 430 after the layer of photosensitive material 430 is patterned. The first thermal treatment process may comprise baking the layer of photosensitive material 430 under the temperature from 90° C. to 120° C. to solidify the patterned layer of photosensitive material 430 in preliminarily and form the isolation layer 432. As shown in FIG. 4C, the isolation layer 432 is formed on the black matrix 420 to enhance the barrier of the pixel areas P for the follow-up process.

Figure 4D:
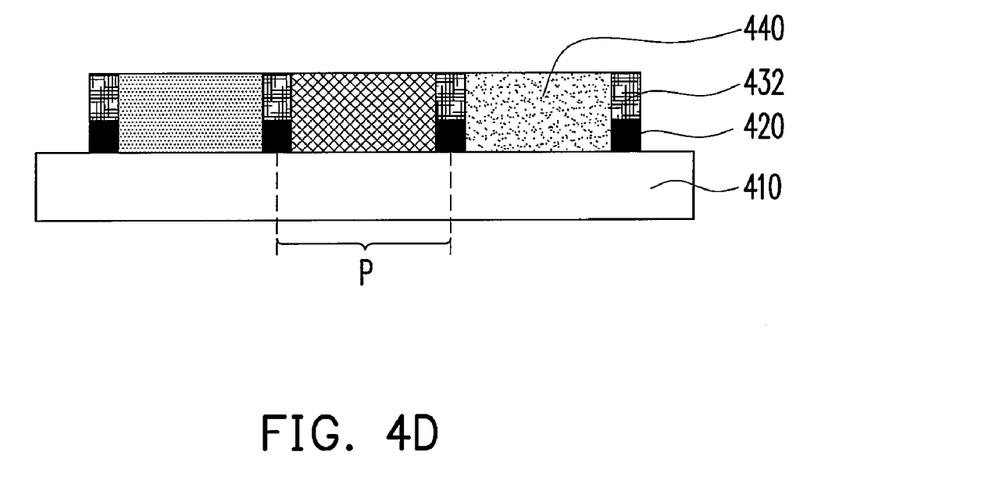

Next, referring to FIG. 4D, the color pigment 440 is filled in the different pixel areas P. In this embodiment, the color pigment 440 is filled in the pixel areas P by ink-jet printing. The color pigment 440 can be selected from one of the group consisting of red pigment, green pigment, blue pigment and other color pigment 440. Because of the barrier of the isolation layer 432, the proper amount of color pigment 440 can be filled in the pixel areas P according to practical demands. The problem of the color mixing of the color pigment 440 can be effectively prevented, and the mura phenomenon can further be avoided with the barrier of the isolation layer 432. In the present manufacturing process, no complicated hydrophobic treatment performed on the black matrix 420 is needed, so as to reduce the cost and simplify the manufacturing process.

Figure 4E:
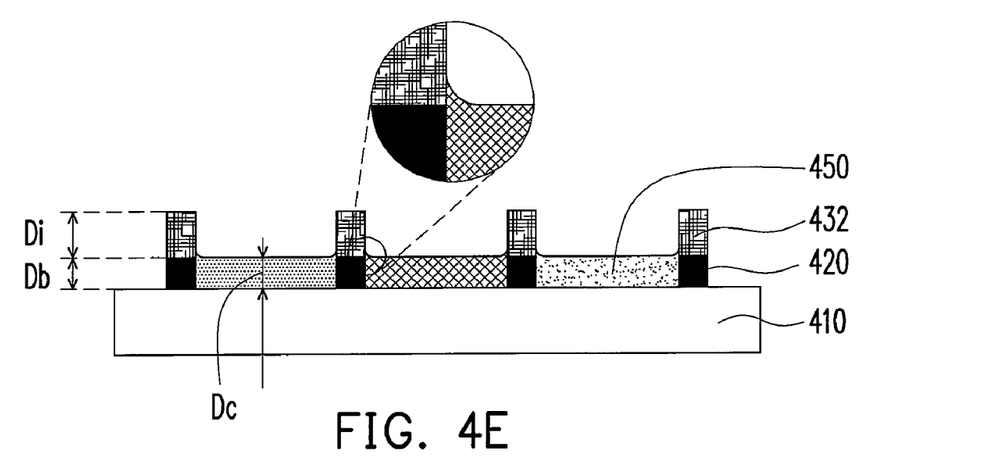

After filling the color pigment 440 in the pixel areas P, the color pigment 440 is dried to form a plurality of color filter units 450 (as shown in FIG. 4E). The processing temperature in the drying process, for example, is in the range from 90° C. to 120° C. The solvent contained in the color pigment 440 is vaporized and solidified preliminarily to form the color filter units 450. Generally speaking, in order to manufacture a color filter with the desired chromaticity, a specific film thickness of the color filter units 450 is needed. However, the evaporation of the solvent contained in the color pigment 440 results to the thermal tension induced deformation of the color pigment 440, which deteriorates the quality of the color filter units 450. Using the isolation layer 432 in the present invention allows enough color pigment 440 to be filled in the pixel areas P to solve the above problem, wherein the even film thickness Dc of the color filter units 450 is obtained to improve the quality of the color filter.

Figure 4F:
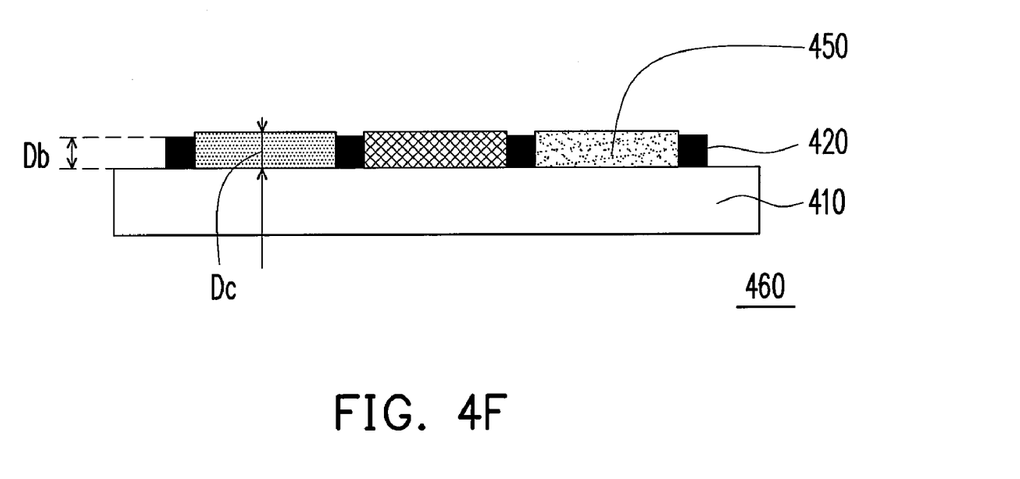

Next, the isolation 432 is removed to form the color filter 460 as shown in FIG. 4F. In this embodiment, the isolation layer 432 is removed by dry etching or by using a specific developer or stripper. The advantages of using these methods are that the color filter units 450 and the black matrix 420 will not be corroded or damaged during the process of removing the isolation layer 432. In fact, the color filter 460 will not be destroyed during the process of forming the isolation layer 432 or removing the isolation layer 432 in the present invention.

After removing the isolation layer 432, a second thermal treatment process is further performed. For example, a baking process under the temperature from 200° C. to 240° C. is performed. By that, the color filter units 450 can be solidified completely, and the acute angles (shown in FIG. 4E), occurred in the above process, between the color filter units 450 and the isolation layer 432 can be eliminated to improve the quality of the color filter 460. It is noted that the film thickness Dc of the color filter units 450 can be made substantially the same as the film thickness Db of the black matrix 420 due to the barrier of the isolation layer 432. Therefore, the color filter 460 has good quality, and the smooth surface thereof advantages the coverage of the follow-up film layer.

As mentioned above, the manufacturing method of the color filter of the present invention at least has the following advantages: first, the isolation layer is provided in the manufacture of the color filter to avoid the problem of color mixing as filling the color pigment in the pixel areas. Therefore, no complicated hydrophobic treatment performed on the black matrix 420 is needed as fabricating the color filter, so as to lower the manufacturing cost. Furthermore, the photo spacers can be formed together with the color filter in the same process, which takes advantage of simplifying the manufacturing process. Furthermore, the manufacturing method of the color filter of the present invention can fill the proper amount of the color pigment in the pixel areas, so as to obtain an even color filter with uniform film thickness. Therefore, saturated color display can be achieved and mura phenomenon is eliminated.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A manufacturing method of a color filter, comprising:
   providing a transparent substrate;
   forming a black matrix on the transparent substrate to define a plurality of pixel areas on the transparent substrate;
   forming a layer of photosensitive material on the transparent substrate;
   patterning the layer of photosensitive material to form a patterned isolation layer on the black matrix;
   filling a plurality of color pigments in the pixel areas respectively;
   drying the color pigments to form a plurality of color filter units, wherein the film thickness of the color filter units is substantially same as the film thickness of the black matrix; and
   patterning the patterned isolation layer to remove a portion of the patterned isolation layer and form at least one pillared spacer on the black matrix, wherein a sum of the height of the pillared spacer and the film thickness of the black matrix is bigger than or equal to double of the film thickness of the color filter units.

2. The manufacturing method of a color filter of claim 1, wherein the process of patterning the layer of photosensitive material comprises:
   performing a lithography process on the layer of photosensitive material to pattern the layer of photosensitive material.

3. The manufacturing method of a color filter of claim 2, wherein the black matrix is used as a mask and a backward exposure is performed on the layer of photosensitive material from a side of the transparent substrate far away from the layer of photosensitive material, in the lithography process.

4. The manufacturing method of a color filter of claim 2, further comprising:
   performing a first thermal treatment process on the layer of photosensitive material after patterning the layer of photosensitive material, wherein the processing temperature of the first thermal treatment process is controlled to maintain the isolation layer being photosensitive.

5. The manufacturing method of a color filter of claim 4, wherein the processing temperature of the first thermal treatment process is in the range from 90° C. to 120° C.

6. The manufacturing method of a color filter of claim 4, wherein the first thermal treatment process comprises baking.

7. The manufacturing method of a color filter of claim 1, wherein the processing temperature of drying the color pigment is in a range from 90° C. to 120° C.

8. The manufacturing method of a color filter of claim 4, further comprising:
   performing a second thermal treatment process after patterning the isolation layer.

9. The manufacturing method of a color filter of claim 8, wherein the processing temperature of the second thermal treatment process is in a range from 200° C. to 240° C.

10. The manufacturing method of a color filter of claim 8, wherein the second thermal treatment process comprises baking.

11. The manufacturing method of a color filter of claim 1, wherein the color pigments are filled in the pixel areas by inkjet printing.

12. The manufacturing method of a color filter of claim 1, wherein the shape of the pillared spacer comprises column.

13. A color filter, comprising:
    a transparent substrate;
    a black matrix disposed on the transparent substrate to define a plurality of pixel areas on the transparent substrate;
    a plurality of color filter units disposed in the pixel areas respectively; and
    at least one pillared spacer formed on a portion of a top surface of the black matrix, and exposing a portion of the top surface of the black matrix,
    wherein the film thickness of the color filter units is substantially same as the film thickness of the black matrix, and a sum of the height of the pillared spacer and the film thickness of the black matrix is bigger than or equal to double of the film thickness of the color filter units.

14. The color filter of claim 13, wherein a material of the pillared spacer comprises photosensitive material.

15. The color filter of claim 13, wherein a material of the transparent substrate comprises glass.

16. The color filter of claim 13, wherein a material of the color filter units comprises resin.

17. The color filter of claim 13, wherein a shape of the pillared spacer comprises column.

* * * * *